United States Patent [19]

Gulunay et al.

[11] Patent Number: 5,617,372
[45] Date of Patent: Apr. 1, 1997

[54] UNALIASED SPATIAL TRACE INTERPOLATION IN THE F-K DOMAIN

[75] Inventors: Necati Gulunay, Missouri City; Ronald E. Chambers, Houston, both of Tex.

[73] Assignee: Western Atlas International, Inc., Houston, Tex.

[21] Appl. No.: 696,466

[22] Filed: Aug. 14, 1996

[51] Int. Cl.$^6$ ............................................. G01V 1/28
[52] U.S. Cl. ........................... 367/38; 364/421; 367/59
[58] Field of Search ............................. 367/38, 59, 63; 364/421

[56] References Cited

U.S. PATENT DOCUMENTS

| | | | |
|---|---|---|---|
| 4,594,693 | 6/1986 | Pann et al. ........................... | 367/43 |
| 4,922,465 | 5/1990 | Pieprzak et al. ..................... | 367/38 |
| 5,206,837 | 4/1993 | Beasley et al. ...................... | 367/38 |
| 5,235,556 | 8/1993 | Monk et al. ......................... | 367/63 |

FOREIGN PATENT DOCUMENTS 2282665  4/1995  United Kingdom ............. G01V 1/28

OTHER PUBLICATIONS

Seismic Trace Interpolation in the f-x Domain, Geophysics v. 56, n. 6, pp. 785–794.

*Primary Examiner*—Ian J. Lobo
*Attorney, Agent, or Firm*—William A. Knox

[57] ABSTRACT

Sparsely spatially-sampled seismic time-scale trace gathers may be aliased for certain spatial and temporal frequencies. Aliasing may be avoided by application of a spatial interpolation scheme that uses the phase difference between the f-k phase spectra of the odd and the even traces to generate an interpolation operator in the f-k domain. The operator is multiplied point-by-point with the f-k transform of the original recorded trace gather. The resulting complex product is inverse transformed to the t-x domain whereupon the interpolated traces are interleaved between the original recorded traces to unwrap the aliased events.

8 Claims, 9 Drawing Sheets

FIG. 9C

UNALIASED SPATIAL TRACE INTERPOLATION IN THE F-K DOMAIN

BACKGROUND OF THE INVENTION

1. Field of the Invention

A method for economically de-aliasing spatially-aliased seismic data using trace interpolation methods confined to the f–k domain.

2. Discussion of Relevant Art

The art of seismic exploration requires that a plurality of acoustic receivers be disposed at designated stations distributed at regular spatial intervals over a line or area of survey. An acoustic source visits selected stations over the survey area whereupon at each station visited, it radiates an acoustic wavefield into the earth. The wavefield propagates in all directions, insonifying sub-surface strata. The wavefield is reflected from each stratum in turn, to return to the surface where the reflected wavefield is detected by the receivers.

The acoustic receivers convert the mechanical motions and pressure variations due to the propagating wavefield to electrical analog signals. The electrical signals are sent to suitable recording and processing equipment over data transmission channels of any desired type. The analog signals representative of the received acoustic wavefields are recorded as a periodic function of signal level vs. two-way wavefield reflection travel time. The periodic electrical analog signals, as seen by each of the receivers, are discretized in the time domain at selected sample intervals and then recorded as a plurality of discrete time-scale traces, one trace for each station occupied by a receiver. A suite of traces recorded at a single receiver station, due to wavefields generated from a set of sequentially-visited source locations, might comprise a common receiver gather in the time-space (t–x) domain.

The useful temporal frequency of the received seismic data lies in the range of 5 to about 125+ hertz. In data-sampling theory, it is fundamental that no wavelength embedded in the data can be shorter than twice the sampling interval, otherwise the data are distorted due to aliasing. Given a selected temporal sample interval, the received seismic signals may be electrically or optically low-pass filtered before digitization in the time domain to exclude frequencies above the aliasing frequency, which is also referred to as the temporal Nyquist or temporal folding frequency. Thus for a 4-millisecond (ms) sample interval, frequencies above 125 Hz ($\lambda$=8 ms) must be excluded. Insofar as a single one-dimensional time-scale trace is concerned, selection of the proper sample interval and the corresponding anti-aliasing filter is a simple operator-selectable instrumental option.

In real life, seismic data are multi-dimensional rather than uni-dimensional. Along a preselected line of survey, including a plurality of serially adjacent seismic traces the data reside in a 2-D, temporal-spatial (t–x) domain. In an areal survey, the data may be in the 3-D (t–x–y) domain. In the presence of steeply-dipping strata, if the source or detector station spacing is too wide relative to the spatial frequency of a dipping stratum, the data will be spatially aliased.

Figures 1A, 1B:
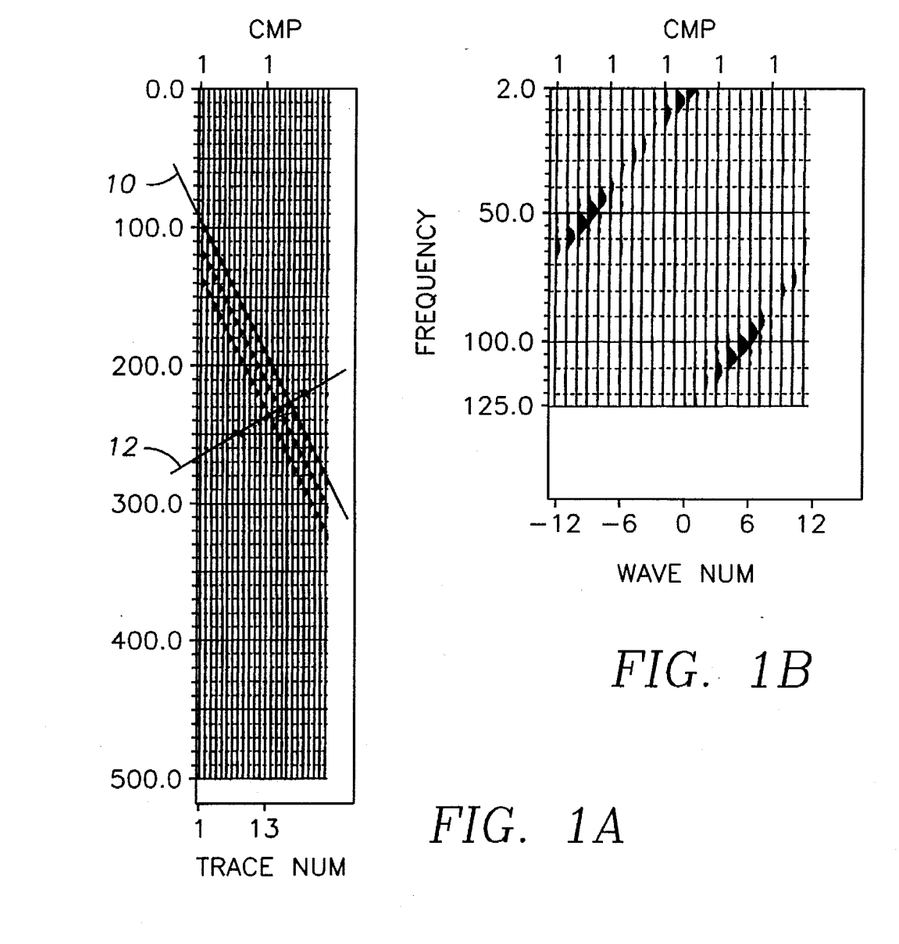
FIG. 1A is a display of known sparsely-sampled seismic data in the t–x domain.
FIGS. 1B, C are the corresponding amplitude and phase spectra of the data transformed to the f–k domain.

FIG. 1A is a set of 24 synthetic time scale traces plotted from t=0.0 millisecond (ms) to t=500.0 ms as derived from a number of common midpoint (CMP) gathers. Three parallel events are shown having a spatial dip of 8 ms per trace in the positive direction as shown by sloping line 10. Because of the wide spacing between traces, it would be easy to mistakenly draw false or aliased negative dips of about 2.5 ms per trace as shown by sloping line 12, particularly if the data had been partially obscured by random noise. If now, there had been available a set of traces having half the spacing of FIG. 1A, such as in FIG. 2A where the dip is but 4 ms per trace, there would be little doubt as to the interpretation of the correct dip.

By definition, the spatial phase shift of a coherent event is the time difference between the same event as seen on two adjacent traces. Given a cluster of events having reasonably uniform dips characterized by a narrow range of spatial frequencies, then it would be a simple matter to average the phase shift between traces and interleave the averaged traces between the original traces of FIG. 1A as suggested by FIG. 2A. But real data includes a whole spectrum of spatial frequencies and phase shifts. Therefore such a simplistic approach is not possible.

As is well known to the art, the spectrum of spatial frequencies is best examined by transforming the time scale data from the t–x (time-space) domain to the f–k (frequency-wavenumber) domain using a fast Fourier transform by way of example but not by way of limitation (the wavenumber is the number of cyclic periods per unit distance). FIG. 1B is the 2-D Fourier-transformed amplitude spectrum of FIG. 1A. The data are aliased (folded) at 62.5 hertz (Hz) where the events are wrapped around the central or zero ordinate of the wavenumber axis at an angular phase shift of $\pi$.

As a matter of definitions, the temporal alias frequency in the f–k domain is $-\frac{1}{2}\Delta t < f < +\frac{1}{2}\Delta t$. In the spatial coordinate, the spatial alias frequency or wavenumber is $-\pi/\Delta x < k < +\pi/\Delta x$. Here $\Delta t$ is the sample-time interval in milliseconds and $\Delta x$ is the station spacing in preferred units.

As previously stated, selection of the temporal sample interval is a simple user-selectable, instrumental option. But selection of the spatial sampling interval on the ground is much more complex. The station spacing needs to be as sparse as possible for economic reasons because operating costs per seismic station are very expensive. The problem becomes exacerbated in designing a survey for a previously unexplored area having unknown dips. If the spatial frequencies in the area on the average, turn out to exceed the Nyquist limit expected when the original survey strategy was laid out, it may not be economical or, perhaps not even possible such as because of political upheaval, to return to the region to physically acquire additional coverage. Aliased spatial frequencies wreak havoc with migration and interpretation of the seismic data sets as explained earlier.

An interpolation scheme in the f–x domain has been developed by S. Spitz in a paper entitled *Seismic Trace Interpolation in the F–X Domain*, Geophysics, v. 56, n. 6, June, 1991, pp 785–794. The method is based on the fact that linear events present on a section made of equally spaced traces may be interpolated exactly, regardless of the original spatial interval, without any attempt to determine their true dips. The predictability of linear events in the f–x domain allows the missing traces to be expressed as the output of a linear system, the input of which consists of the recorded traces. The interpolation operator is obtained by solving a set of linear equations whose coefficients depend only on the spectrum of the spatial prediction error filter defined by the recorded traces. The prediction error filter is obtained from the known data at half the temporal frequency. The Spitz method involves two sets of linear equations, one for the prediction error filter and one for the unknown data. Accurate calculation of the unknown data requires edge-free design of the equations. This condition leads to a non-Toeplitz matrix structure that makes dataprocessing by the Spitz method very computer-intensive and therefore very costly.

Another method is disclosed in UK patent application GB-2,282,665-A in the name of Helmut Jakubowicz, published 12/04/95. In this disclosure, each data set such as a common receiver gather is applied to a sinc filter to generate additional data for interpolation intermediate the recorded actual data. The recorded actual data are also subject to traveltime angularity correction. Interlacing sinc data interpolated with the known data does not unwrap the spectrum but produces a spatially band-limited spectrum. Furthermore, temporal frequencies above a certain critical frequency remain wrapped along the k-axis which might necessitate temporal band-limiting of the data.

There is a need for an economical computer-implemented method for interpolating spatially aliased, multi-dimensional data sets.

SUMMARY OF THE INVENTION

A method for unwrapping spatially aliased signals representative of an acoustic wavefield propagated from an acoustic source. The signals representative of the wavefield are sampled at each of a first plurality of signal-sampling locations which are spaced apart by known distances. The signal samples from the respective sampling locations are formatted as a recorded gather of sequentially-ordered time-scale traces. The time-scale traces of the recorded gather are transformed from the t-x domain to the frequency-wavenumber (f-k) domain to form a transformed gather, the temporal frequency range f is (0, $F_N$) and the range of wavenumbers k is ($-K_N$, $+K_N$) where $F_N$ and $K_N$ are the temporal and spatial Nyquist frequencies respectively. A first transform gather is formed from the odd numbered traces of the recorded transform gather for temporal frequencies between zero and $F_N/2$ and for spatial frequencies between $-K_N/2$ and $+K_N/2$. A second transform gather is similarly formed from the even numbered traces of the recorded transform gather for the corresponding temporal and spatial frequencies. The temporal frequencies of the first and second transform gathers are stretched from range (0, $F_N/2$) to range (0, $F_N$) by interpolation thereby to form third and fourth transform gathers. Next, the spatial frequencies of the third and fourth transform gathers are stretched from range ($-K_N/2$, $+K_N/2$) to range ($-K_n$, $+K_N$) to form fifth and sixth transform gathers. The sixth transform gather is divided by the fifth transform gather to define the f-k transform of an interpolation operator U. The f-k transform of the interpolation operator U is multiplied point-by-point with the original f-k transform of the recorded gather to form a complex product. The complex product is inverse transformed from the f-k domain to the t-x domain to provide a second gather of time scale traces. The respective traces of second gather of time-scale traces are interleaved between the time-scale traces of the original recorded gather.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIGS. 2A, B, C correspond to FIGS. 1A, B, C for well-sampled seismic data;

FIGS. 3A, B, C are desired time-scale traces, the amplitude spectrum and the phase spectrum of their transforms;

FIGS. 5A, B, C are the odd-numbered time scale traces and the corresponding amplitude and phase spectra of their transforms;

FIGS. 6A, B, C correspond to FIGS. 5A, B, C for the even traces;

FIGS. 9A, B, C are the results of interpolation.

DETAILED DESCRIPTION OF THE PREFERRED EMBODIMENT

Figure 1C:
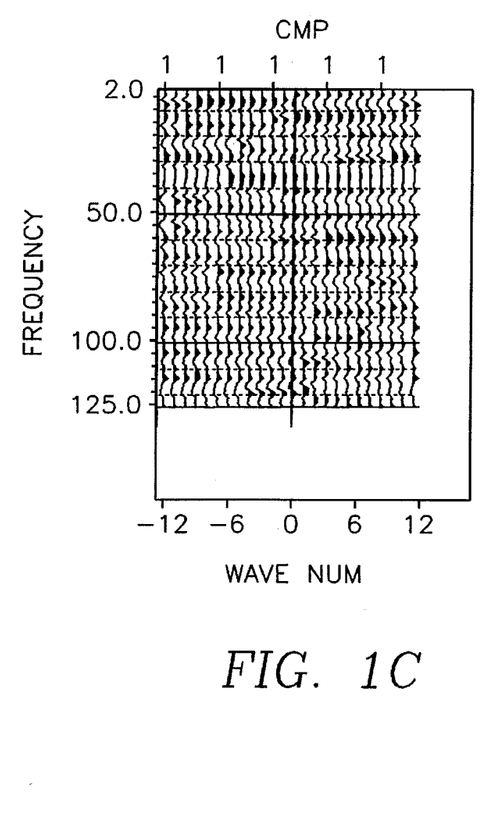

FIG. 1A is an example of a gather, in the t–x domain, of sequentially ordered time scale traces as recorded during a seismic survey operation. As explained earlier, the sparsely distributed sampling stations have resulted in spatial frequency aliasing. FIG. 1B is the amplitude spectrum of in the f–k domain after applying a 2-D Fourier transform to the data of FIG. 1A using computer-aided methods for the transform routine and a conventional computer graphics program of any desired type for displaying the results. FIG. 1B indicates wrap-around aliasing of frequencies above 62.5 Hz. FIG. 1C is the corresponding phase spectrum.

Figures 2A, 2B:
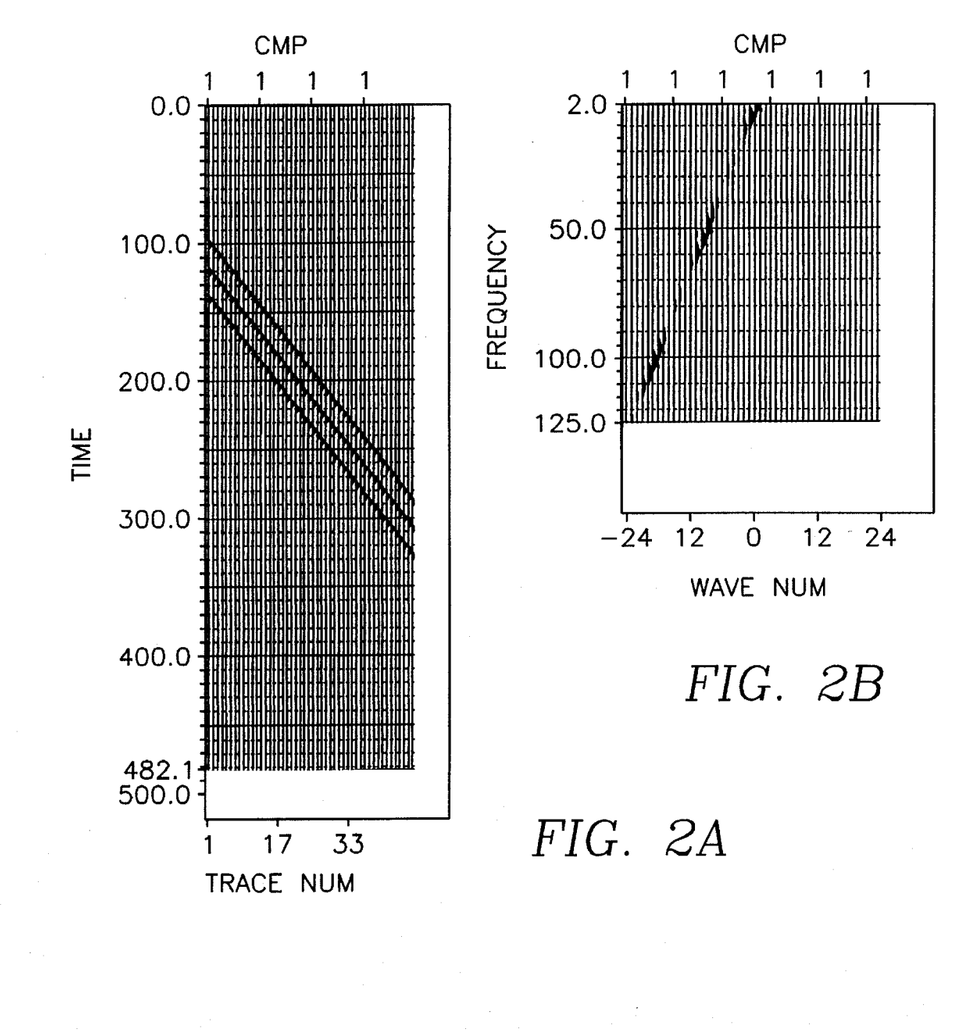
Figure 2C:
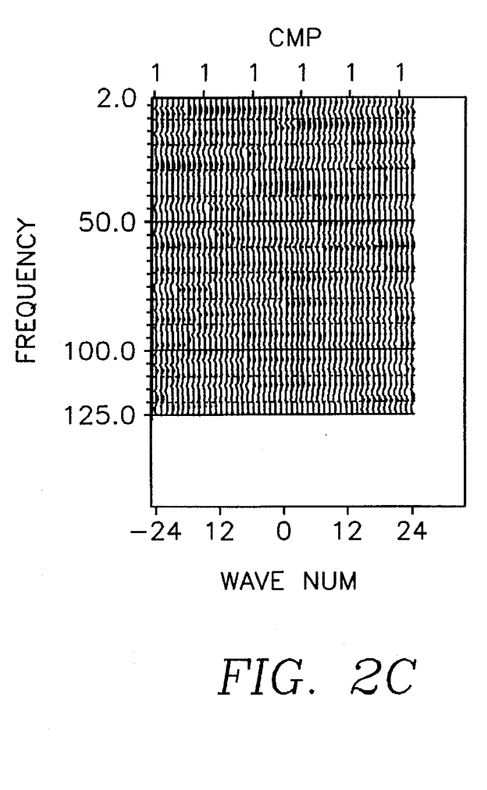

FIG. 2A is a display of a desired gather which, as indicated by the (f–k)—amplitude spectrum transform of FIG. 2B, the data of which are not aliased because of the increased density of the sampling stations. The apparent gaps in the amplitude spectrum are due to mutual interference between the three parallel-dipping events. FIG. 2C, is the phase spectrum. (For tutorial purposes, FIG. 1A was derived by selecting every alternate trace from the synthetic example of FIG. 2A).

Given the recorded time-scale trace gather of FIG. 1A, the spatially aliased signals can be de-aliased by use of a suitable trace-interleaving scheme now to be explained.

The input data are transformed from the t–x domain to the f–k domain by use of any well-known 2-D Fourier transform computer routine. The transformed traces may be arranged as members, r, of a matrix $M_0$:

| r | r | r | r | r | r | r | r | f = 0 | 1 | 1 | 1 | 1 | 2 | 2 | 2 | 2 |
|---|---|---|---|---|---|---|---|---|---|---|---|---|---|---|---|---|
| r | r | r | r | r | r | r | r |  | 1 | 1 | 1 | 1 | 2 | 2 | 2 | 2 |
| r | r | r | r | r | r | r | r |  | 1 | 1 | 1 | 1 | 2 | 2 | 2 | 2 |

-continued

| | | | | | | | | | | | | | | | | |
|---|---|---|---|---|---|---|---|---|---|---|---|---|---|---|---|---|
| r | r | r | r | r | r | r | r | | 1 | 1 | 1 | 1 | 2 | 2 | 2 | 2 |
| r | r | r | r | r | r | r | r | $F_N/2$ | 1 | 1 | 1 | 1 | 2 | 2 | 2 | 2 |
| r | r | r | r | r | r | r | r | | | | | | | | | |
| r | r | r | r | r | r | r | r | | | | | | | | | |
| r | r | r | r | r | r | r | r | | | | | | | | | |
| r | r | r | r | r | r | r | r | $f = F_N$ | | | | | | | | |
| | | | $M_0$ | | | | | | | | | $M_1$ | | | $M_2$. | |

The matrix dimensions are 2L+1 rows (corresponding to $F_N$) by 2N columns (corresponding to $2K_N$), the subscript N indicating the Nyquist frequency and wavenumber as previously taught. In this example, the number of temporal frequencies is 9 (L=4) and the number of wavenumbers is 8 (N=4). In general, the number of frequencies approaches half the number of samples and the number of wavenumbers approaches the number of traces in the gather.

Matrix $M_1$ is derived from all traces of matrix $M_0$ over the temporal frequency interval from f=0 to f=$F_m$, (m=0, 1, 2, . . ., L) and over the spatial frequency interval from k=$-K_N/2$ to k=$+K_{N-1}/2$ (n=0, 1, 2, . . . , N−1) using a relation having the form $$M_1 = (M_0[m,n] + M_0[m,n+N])/2. \quad (1)$$

Matrix $M_2$ is derived from all traces of $M_0$ over the temporal frequency interval from f=0 to f=$F_m$ (m=0, 1, 2, . . . L) and over the spatial frequency interval from k=$-K_{n+1}/2$ to k=$+K_N/2$ (n=0, 1, 2, . . . , N−1) using a formulation having the form:

$$M_2 = exp(-j2\pi n/2N)(M_0[m,n] - M_0[m,n+N]). \quad (2)$$

In matrices $M_3$ and $M_4$, the temporal frequencies of $M_1$ and $M_2$ are stretched from the range 0, $F_N/2$ to 0, $F_n$ such as by use of an inter-frequency data interpolation symbol î:

| | | | | | | | | | |
|---|---|---|---|---|---|---|---|---|---|
| 1 | 1 | 1 | 1 | | 2 | 2 | 2 | 2 | f = 0 |
| î | î | î | î | | î | î | î | î | |
| 1 | 1 | 1 | 1 | | 2 | 2 | 2 | 2 | |
| î | î | î | î | | î | î | î | î | |
| 1 | 1 | 1 | 1 | | 2 | 2 | 2 | 2 | |
| î | î | î | î | | î | î | î | î | |
| 1 | 1 | 1 | 1 | | 2 | 2 | 2 | 2 | |
| î | î | î | î | | î | î | î | î | |
| 1 | 1 | 1 | 1 | | 2 | 2 | 2 | 2 | $f = F_N/2 \equiv F_N$ |
| | $M_3$ | | | | | $M_4$. | | | |

Matrices $M_3$ and $M_4$ are next stretched across their wavenumber axes by use of interpolation symbol, ï, between wavenumbers thereby halving the spatial frequencies to form matrices $M_5$ and $M_6$:

| | | | | | | | | | | | | | | | | |
|---|---|---|---|---|---|---|---|---|---|---|---|---|---|---|---|---|
| 1 | ï | 1 | ï | 1 | ï | 1 | ï | f = 0 | 2 | ï | 2 | ï | 2 | ï | 2 | ï |
| î | ï | î | ï | î | ï | î | ï | | î | ï | î | ï | î | ï | î | ï |
| 1 | ï | 1 | ï | 1 | ï | 1 | ï | | 2 | ï | 2 | ï | 2 | ï | 2 | ï |
| | | | . | | | | | | | | | . | | | | |
| | | | . | | | | | | | | | . | | | | |
| | | | . | | | | | | | | | . | | | | |
| î | ï | î | ï | î | ï | î | ï | | î | ï | î | ï | î | ï | î | ï |
| 1 | ï | 1 | ï | 1 | ï | 1 | ï | $f = F_N/2 \equiv F_N$ | 2 | ï | 2 | ï | 2 | ï | 2 | ï |
| | | $M_5$ | | | | | | | | | | $M_6$. | | | | |

An operator $U_{m,n}$ is formed by dividing matrix $M_6$ by matrix $M_5$ after adding a threshold, T, to $M_5$ to avoid dividing be zero:

$$U_{m,n} = M_6(m,n)/(T + M_5(m,n)). \quad (3)$$

The operator values are multiplied sample-by-sample with the respective data residing in transform matrix $M_0$ to provide a f–k transform of the unknown traces:

$$Output_{m,n} = U_{m,n} * M_0(m,n). \quad (4)$$

The complex product, symbolized by *, resulting from (4) is transformed from the f–k domain to the t–x domain whereupon the calculated traces may be interleaved between the original traces to unwrap the aliased dips.

The best mode of operation is best shown by means of a series of illustrations showing the data as they appear during the progress of the de-aliasing process. FIGS. 1 and 2 have already been discussed.

Figures 3A, 3B:
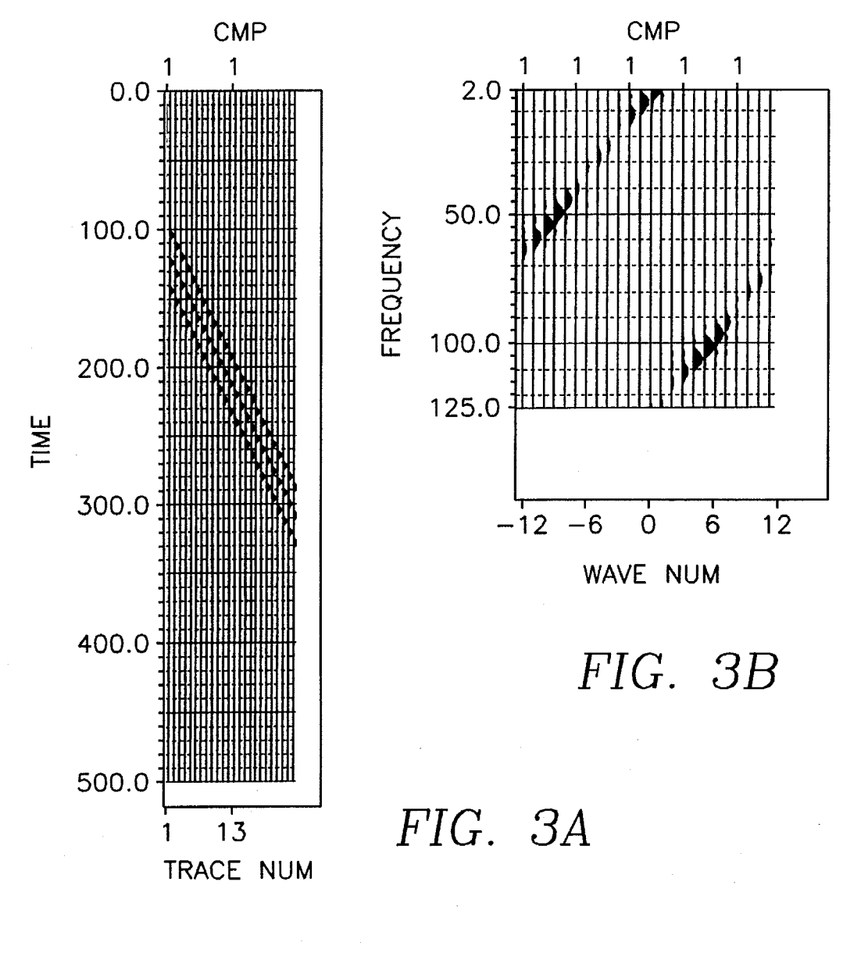
Figure 3C:
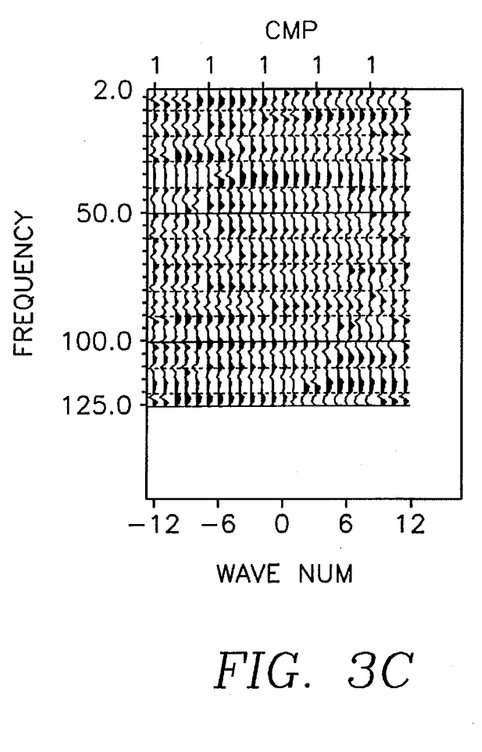
Figure 4A:
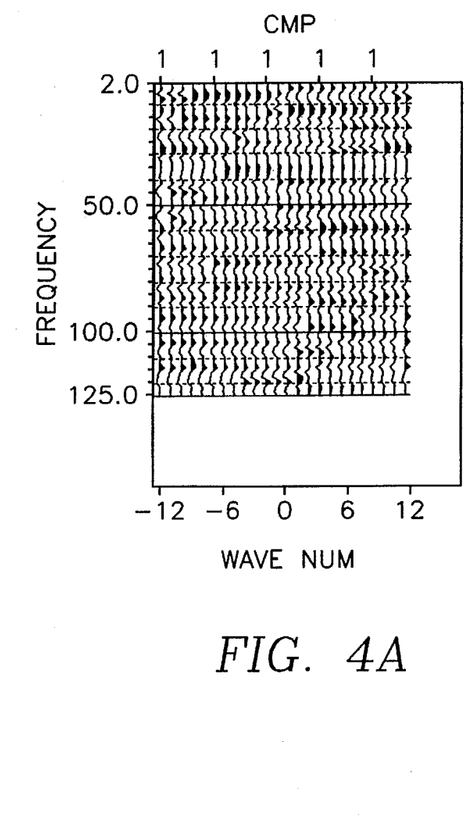
FIGS. 4A, B, C are the phase spectra of the known and desired transforms and the phase difference between the two.
Figure 4B:
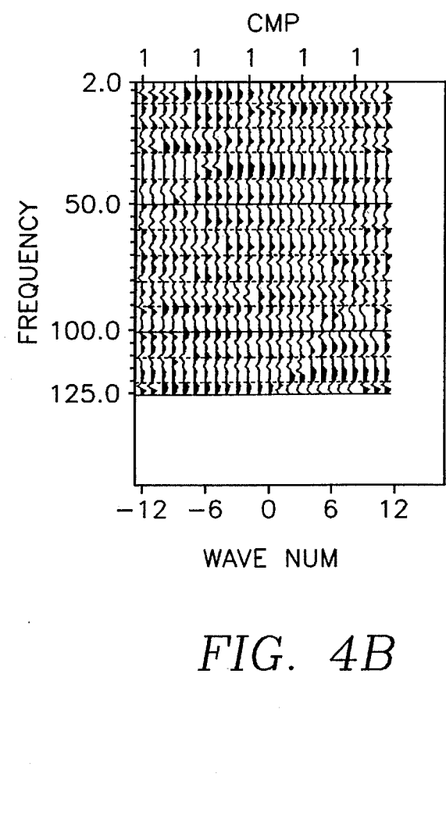
Figure 4C:
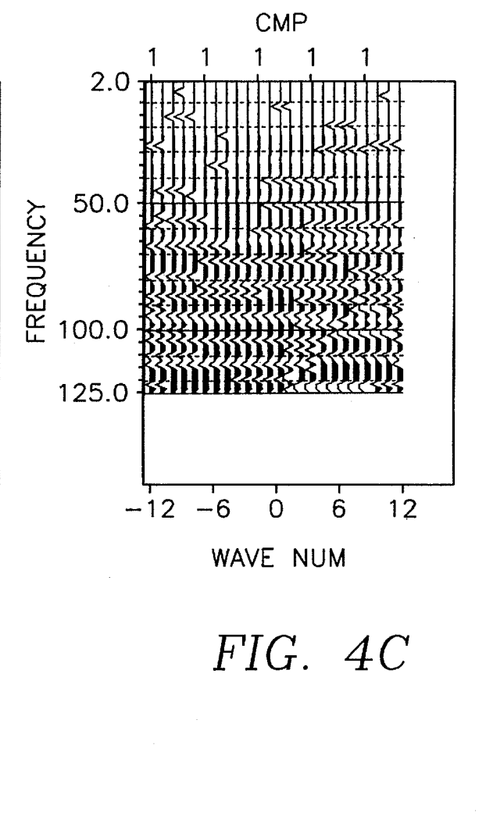

FIG. 3A shows the the desired traces that we would like to create from the known recorded gather of FIG. 1A. FIGS. 3B and 3C are the corresponding desired amplitude and phase spectra. The amplitude spectra of FIGS. 1B and 3B appear to be identical but they differ in phase. The known phase spectrum of FIG. 1C and the desired spectrum 3C are reproduced at FIG. 4A and 4C. Had we known the phase difference as shown at FIG. 4C, we could have applied that difference to the phase spectrum of FIG. 1C, inverse transform the data back to the t–x domain. (In FIGS. 4, trace excursions to the left indicate a −180° phase shift). Absent that information, we employ instead the Fourier transforms of the odd and the even numbered traces of the known recorded data.

Figures 5A, 5B:
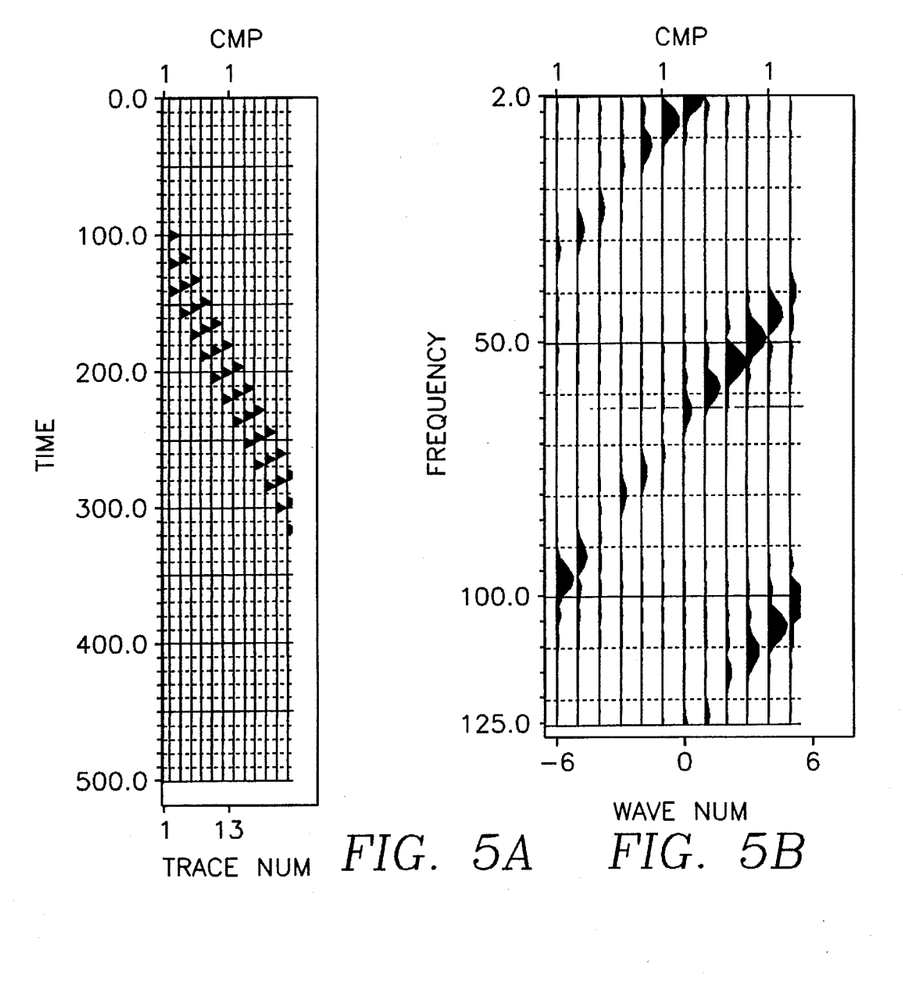
Figure 5C:
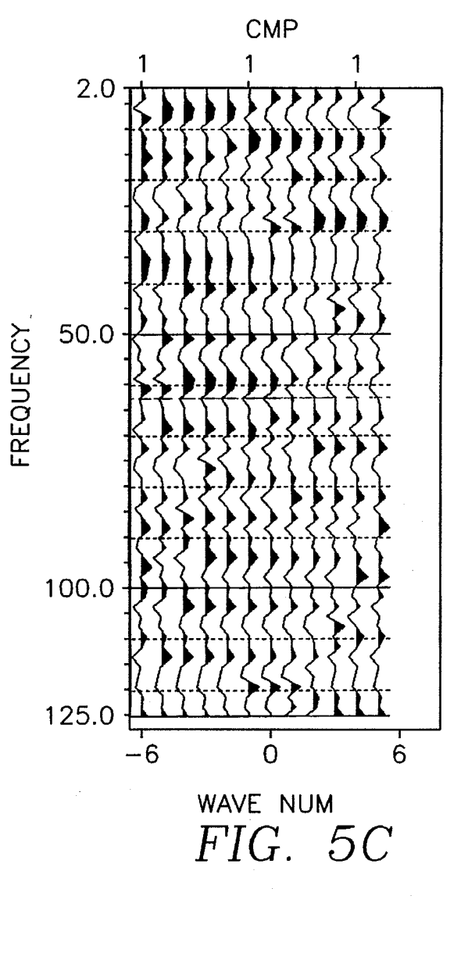

FIGS. 5 shows the odd numbered traces of the known record and the corresponding amplitude and phase spectra. The vertical and horizontal scales are twice that of the previous Figures. Note the alignment of the amplitude spectral values for the upper half of the temporal frequency axis with that of the amplitude spectra given in FIG. 1B and 3B. Values beyond 62.5 Hz are ignored. The vertical temporal frequency axis and the horizontal wavenumber axis of FIG. 5B and 5C are interpolated using a 1 to 2 complex quadratic interpolation formulation of any well known type to stretch the axes by creating an equal number of samples to the f–k transforms of those Figure. Thus, 62.5 Hz of FIG. 5B and 5C will align with 125 Hz of FIG. 1.

Figures 6A, 6B:
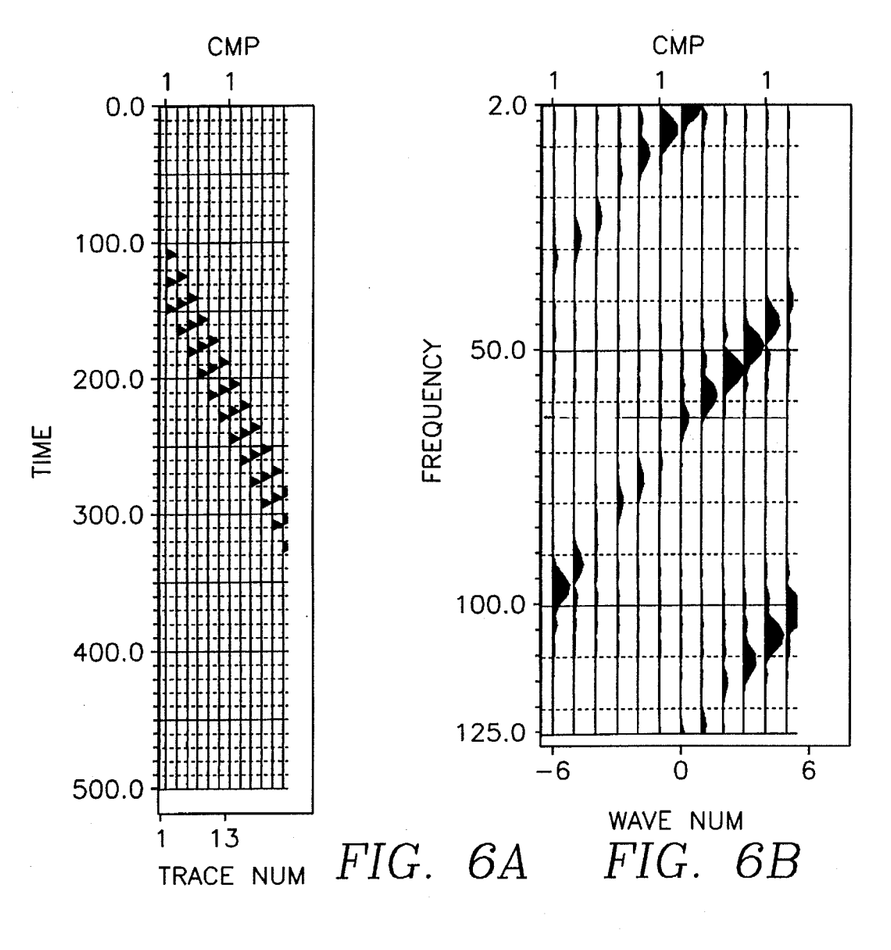
Figure 6C:
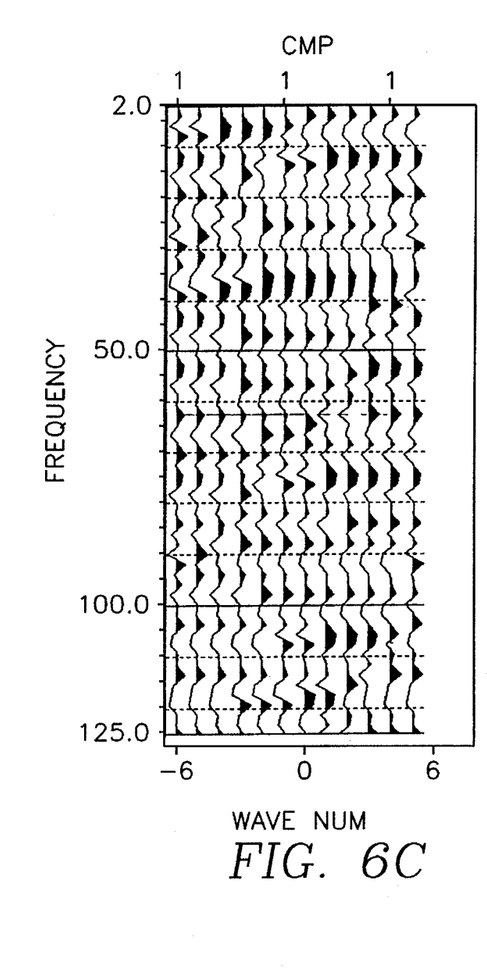

FIGS. 6A, B, C represent the processed traces for the even numbered data.

Figure 7A:
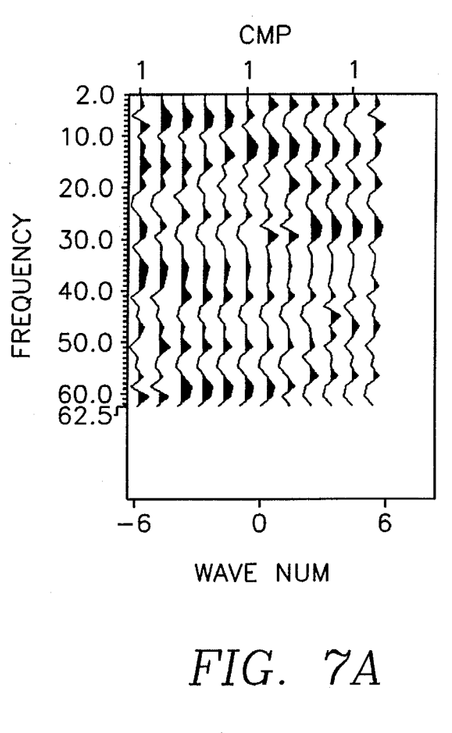
FIGS. 7A, B, C depict the odd and even phase spectra of FIGS. 5C AND 6C and their difference.
Figure 7B:
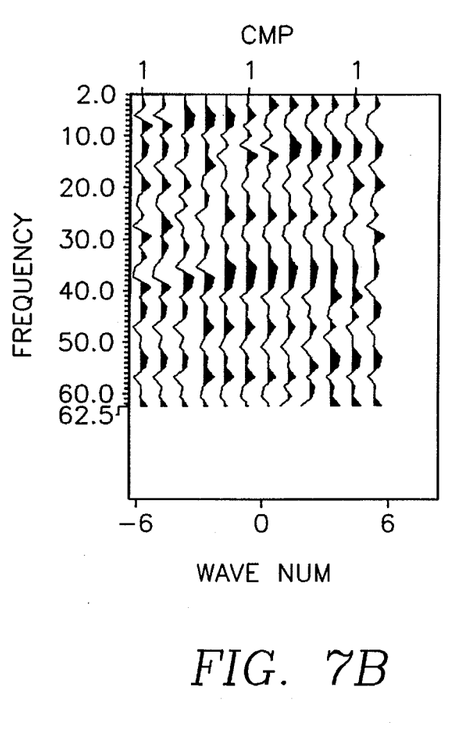
Figure 7C:
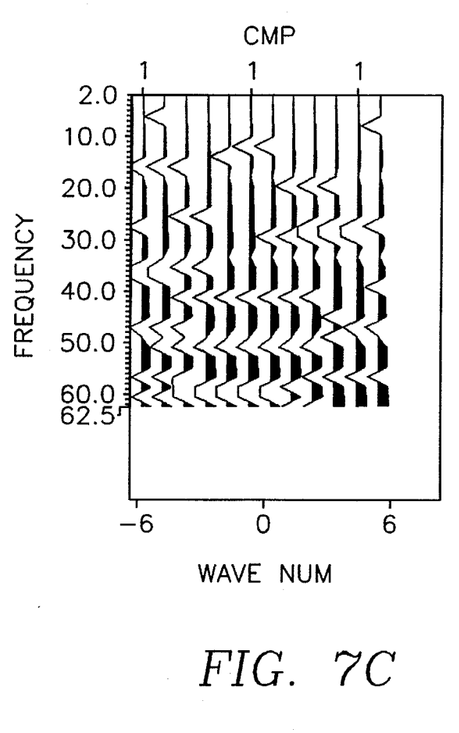

FIGS. 7A and 7B reproduce the phase spectra of FIG. 5C and 6C while 7C is the phase difference. Using the stretched version of the transform, we do complex number divisions of the f–k transforms which is equivalent to taking phase differences.

Figures 8A, 8B:
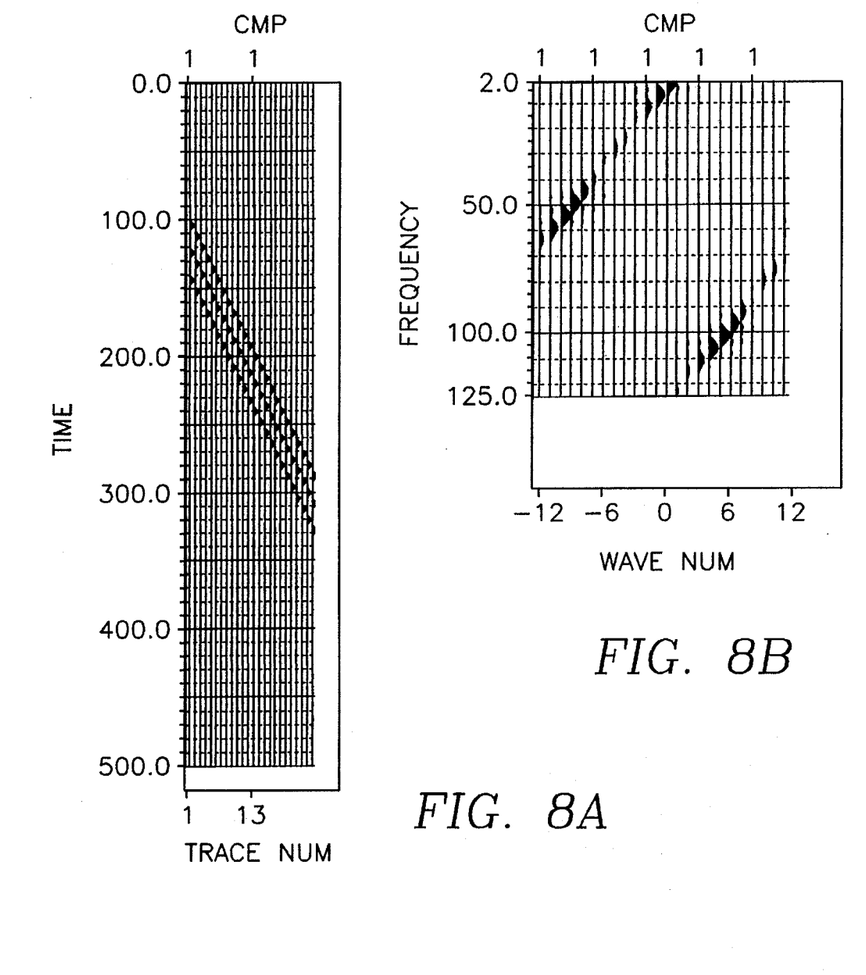
FIG. 8A displays calculated time-scale traces as calculated for interpolation between the time-scale traces of FIG. 1A.
FIGS. 8B, C are the amplitude and phase spectra of the f–k transform of FIG. 8A.
Figure 8C:
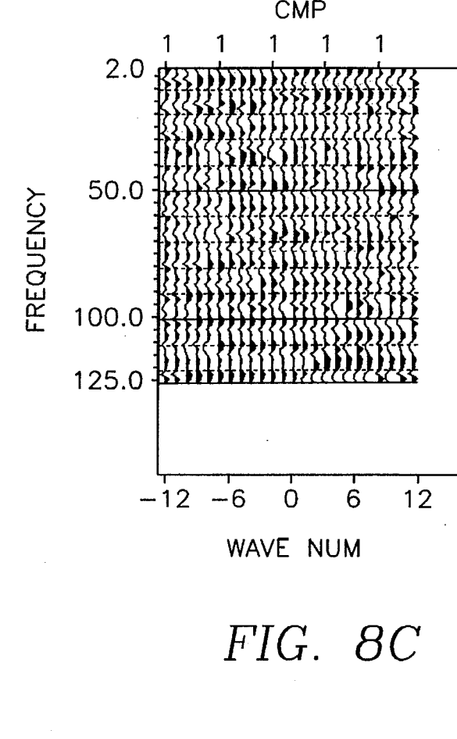

FIGS. 8B–C are the calculated amplitude and phase spectra and 8A is the inverse transform thereof. The data of this figure compare very well with the desired interpolator traces exhibited in FIG. 3A.

Figures 9A, 9B:
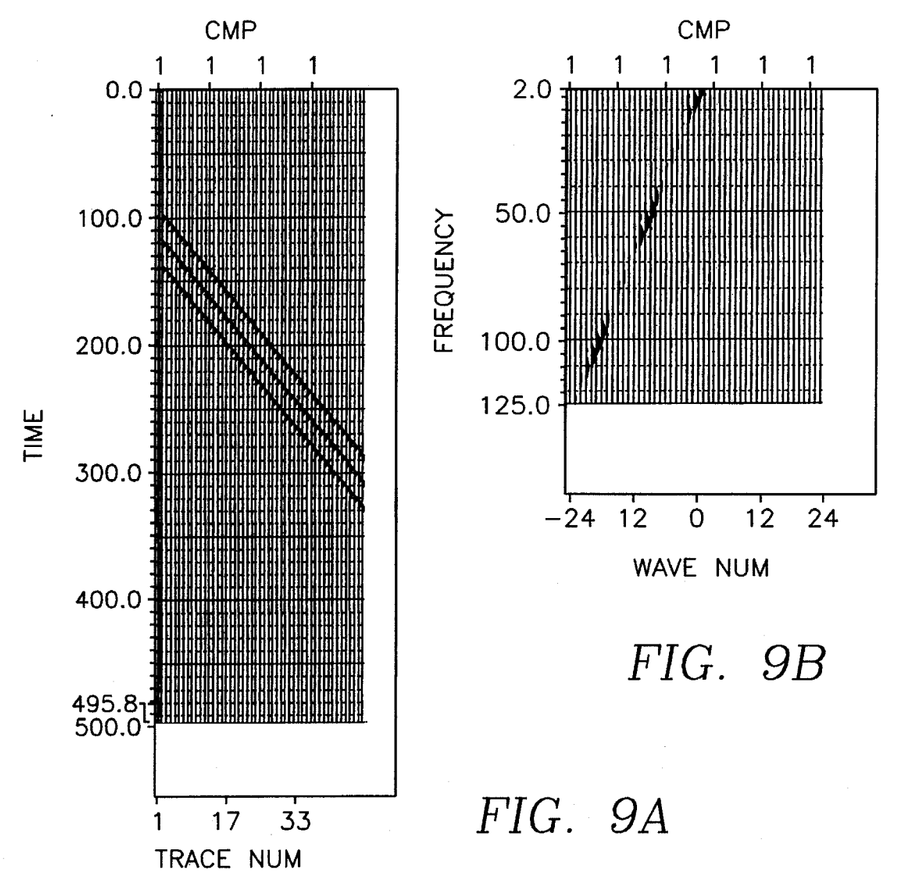
Figure 9C:
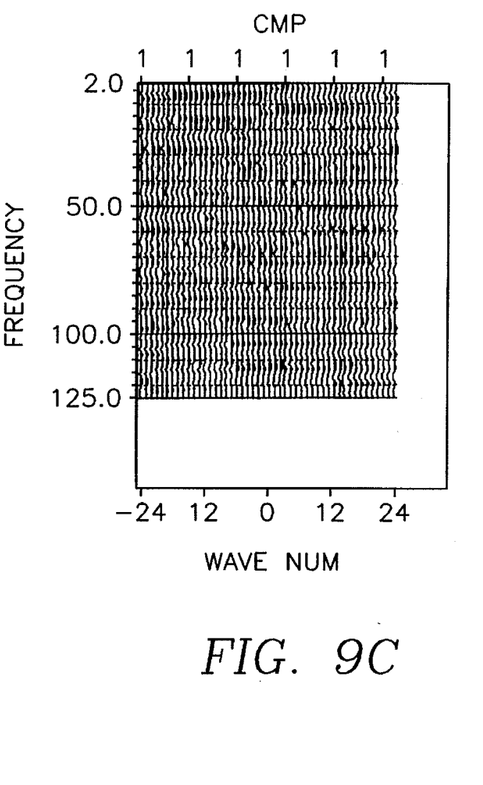

The inversely-transposed traces of FIG. 8A are interleaved with the traces of FIG. 1A to form FIG. 9A. According to FIGS. 9B and 9C, the spectrum is now unwrapped as desired.

This invention has been described with a certain degree of specificity by way of example but not by way of imitation. It is evident that these methods can be applied to both 2-D and 3-D surveys. For example, the roles of the signal-sampling stations and the source stations may be interchanged so as to apply the method to common source gathers in place of common receiver gathers. The invention has been described in terms of seismic-signal arrays but it can be applied to any desired type of spatially-sampled signal mapping processes such as, for example, modeling of weather systems based on data derived from spaced-apart meteorological stations.

Those skilled in the art will devise obvious variations to the examples given herein which may perform the same function in substantially the same way to produce substantially the same results and which will fall within the scope and spirit of this invention which is limited only by the appended claims and equivalents thereof.

What is claimed is:

1. A computer-aided method for de-aliasing spatially aliased signals representative of acoustic wavefields propagating from a plurality of spatially-separated source stations that have been visited in a preferred ordered sequence by an acoustic source, comprising:

at a signal-sampling station, receiving and sampling at preselected discrete time intervals, the signals representative of the respective acoustic wavefields;

formatting the received and sampled signals, propagating from the plurality of source locations, as a recorded gather including a corresponding plurality of serially-ordered time-scale traces;

transforming the recorded gather of odd- and even-numbered time-scale traces from the time-space (t–x) domain to the frequency-wavenumber (f–k) domain to form a known transform matrix over the range $f(0, F_N)$, $k(-K_N, +K_N)$, $F_N$ and $K_N$ being the temporal and spatial Nyquist frequencies;

forming a first transform matrix from the odd-numbered traces of the known transform matrix over the range of $f(0, F_N/2)$ and $k(-K_N/2, +K_N/2)$;

forming a second transform matrix from the even numbered traces of the known transform matrix over the range $f(0, F_N/2)$ and $k(-K_N/2, +K_N/2)$;

forming third and fourth transform matrices by stretching the the first and second transform matrices along their temporal frequency axes by interpolation from the range $f(0, F_N/2)$ to range $f(0, F_N)$;

forming fifth and sixth transform matrices by stretching the third and fourth transform matrices across their spatial wavenumber axes from the range $k(-K_N/2, +K_N/2)$ to range $k(-K_N, +K_N)$;

forming the f–k transform of an interpolation operator from the ratio between the sixth and the fifth transform matrices;

multiplying the f–k transform of the interpolation operator point-by-point with said known transform matrix to form a complex product;

inversely transforming said complex product from the f–k domain into the t–x domain to provide a calculated gather of time scale traces; and interleaving the respective traces of said calculated gather between the time scale traces of said recorded gather.

2. The method as defined by claim 1, comprising:

using a desired computer graphics program, displaying the time scale traces of said recorded gather in combination with the interleaved traces of said calculated gather to provide a spatially de-aliased gather of time scale traces.

3. The method as defined by claim 1, wherein the temporal alias frequency, f, in the f–k domain is defined as $-\frac{1}{2}\Delta t < f < +\frac{1}{2}\Delta t$, where $\Delta t$ is the sample-time interval.

4. The method as defined by claim 3, wherein the spatial alias frequency, k, in the F–K domain is defined as $-\pi/\Delta x < k < +\pi/\Delta x$, where $\Delta x$ is the intertrace spatial separation.

5. A method for practicing the method of claim 1 by interchanging the role of the source and signal-sampling stations.

6. A computer-aided method for de-aliasing spatially aliased signals emanating from a plurality of spaced-apart signal-source stations, said signals having been discretized and formatted as an initial array of serially-ordered odd- and even-numbered time scale-traces in the time-space (t–x) domain, comprising:

transforming the initial array of time scale traces from the (t–x) domain to the frequency wave-number (f–x) domain to form a known transform matrix over the range $f(0, F_N)$, $k(-K_N, +K_N)$, where $F_N$ and $K_N$ are the temporal and spatial Nyquist frequencies respectively;

forming first and second transform matrices respectively from the odd-numbered and the even-numbered traces of the known transform matrix over the range $f(0, F_N/2)$, $k(-K_N/2, +K_N/2)$;

forming third and fourth transform matrices by stretching the first and second transform matrices along their temporal frequency axes from the range $f(0, F_N/2)$ to range $f(0, F_N)$;

forming fifth and sixth transform matrices by stretching the third and fourth transform matrices across their spatial wavenumber axes from the range $k(-K_N/2, +K_N/2)$ to range $k(-K_N, +K_N)$;

dividing the sixth transform matrix by the fifth transform matrix to define an (f–k) transform of an interpolation operator;

forming a complex product by multiplying the f–k transform of the interpolation operator with the known transform matrix point-by-point;

defining a calculated array of time scale traces by inversely transforming said complex product from the f–k domain to the t–x domain; and creating a de-aliased array of traces by interleaving the respective traces of the calculated array between the time scale traces of the initial array.

7. The method as defined by claim 6, comprising:
using a desired computer graphics program, displaying the unaliased trace array.

8. The method as defined by claim 6 wherein said third and fourth transform matrices are formed by stretching the first and second transform matrices along their temporal frequency axes by interpolation from the range $f(0, F_{N/2})$ to range $f(0, F_N)$; and forming fifth and sixth transform matrices by stretching the third and fourth transform matrices by interpolation across their spatial wavenumber axes from range $k(-K_{N/2}, +K_{NB/2})$ to range $k(-K_N, +K_{NB})$.

* * * * *